(12) United States Patent
Huber et al.

(10) Patent No.: US 6,340,085 B1
(45) Date of Patent: Jan. 22, 2002

(54) ROLLER DRIVE UNIT

(75) Inventors: Thomas Huber, Iffeldorf; Martin Dürrwächter, Irschenberg; Matthias Urch, Wörth; Benedikt Kieser, Miesbach, all of (DE)

(73) Assignee: Telair International GmbH, Hausham (DE)

( * ) Notice: Subject to any disclaimer, the term of this patent is extended or adjusted under 35 U.S.C. 154(b) by 0 days.

(21) Appl. No.: 09/255,193

(22) Filed: Feb. 22, 1999

(51) Int. Cl.[7] .............................................. B65G 13/02
(52) U.S. Cl. .................................... 198/782; 198/369.4
(58) Field of Search ............................... 198/369.7, 782

(56) References Cited

U.S. PATENT DOCUMENTS

| | | |
|---|---|---|
| 2,944,297 A | 7/1960 | Maynard |
| 3,447,665 A | 6/1969 | Egeland et al. |
| 3,712,454 A | 1/1973 | McKee |
| 3,873,861 A | 3/1975 | Halm |
| 4,015,154 A | 3/1977 | Tanaka et al. |
| 4,437,027 A | 3/1984 | Yamamoto et al. |
| 4,589,542 A * | 5/1986 | Steadman ................... 198/782 |
| 4,720,646 A | 1/1988 | Torimoto |
| 5,022,513 A * | 6/1991 | Huber ......................... 198/782 |
| 5,025,915 A * | 6/1991 | Huber ......................... 198/782 |
| 5,033,611 A * | 7/1991 | Huber ......................... 198/782 |
| 5,127,513 A * | 7/1992 | Huber ......................... 198/782 |
| 5,131,527 A * | 7/1992 | Huber ......................... 198/782 |
| 5,183,150 A | 2/1993 | Chary et al. |
| 5,213,201 A | 5/1993 | Huber et al. |
| 5,215,184 A * | 6/1993 | Huber ......................... 198/782 |
| 5,938,003 A * | 4/1998 | Huber et al. ................. 198/782 |
| 5,960,934 A * | 8/1999 | Huber et al. ................. 198/782 |
| 6,135,269 A * | 10/1999 | Huber et al. ................. 198/718 |

FOREIGN PATENT DOCUMENTS

| | | |
|---|---|---|
| DE | 19 56 946.1 | 11/1970 |
| DE | 39 19 613 | 12/1990 |
| DE | 43 36 978 A1 | 5/1995 |
| DE | 195 39 627 | 5/1996 |
| EP | 355 251 | 2/1990 |
| EP | 497 045 | 8/1992 |
| WO | WO 96/28719 | 9/1996 |

* cited by examiner

Primary Examiner—Christopher P. Ellis
Assistant Examiner—Rashmi Sharma
(74) Attorney, Agent, or Firm—Knobbe, Martens, Olson & Bear LLP

(57) ABSTRACT

A roller drive unit is provided for an air freight system in an aircraft and comprises a drive roller that can be retracted and raised in order to transport freight containers in various directions. Unlike conventional roller drive units of this type which are only capable of conveying freight containers in forward or backward directions, the roller drive unit of the present invention is adapted to convey freight containers in any desired direction. To this end the roller drive unit comprises a substantially annular fixing device for attachment of the roller drive unit to the floor of a cargo hold and, in a preferably flush relationship thereto, a carrier device for the drive roller. The carrier device can be rotated about an axis perpendicular to the floor of the cargo hold, i.e. about at vertical axis, relative to the fixing device to enable the freight container to be transported in a desired direction.

9 Claims, 3 Drawing Sheets

ROLLER DRIVE UNIT

FIELD OF THE INVENTION

The present invention relates to a roller drive unit for use in the transportation of freight containers and the like.

DESCRIPTION OF THE PRIOR ART

Roller drive units of this type are disposed, for example, in a roller conveyor track for the transportation of items of cargo, which usually comprise freight containers or freight pallets. In particular, a roller drive unit as proposed in the present invention is preferably of the type for installation in the cargo hold of a freight-transporting aircraft in such a way that a plurality of them form roller conveyor tracks by means of which containers, or the cargo to be conveyed is transported over rollers into the cargo hold and stored in the place provided.

When such a roller drive unit is turned on, an associated roller is swiveled upward so as to press against the bottom of a freight container situated above it. Owing to the resulting frictional engagement, the torque of the drive roller is transferred to the bottom of the freight container and the latter is thereby moved.

In the roller drive unit disclosed in the European Patent EP 0 391 175 A2, the item of cargo can only be moved forward or backward. Roller conveyor tracks formed of such roller drive units allow cargo items to move only in a direction determined by the orientation of the drive rollers of the roller drive unit or in the reverse direction. In order to store the cargo item suitably in the cargo space, therefore, as a rule it is necessary for the operating staff to push the item manually from one roller conveyor track to the next roller conveyor track until the item comes into the region of the intended storage place. Once it is in this region, the cargo item must, again manually, be moved into the intended place. As a result, the loading and unloading process is quite lengthy and hence also expensive, in particular because the airport fee depends on the time the aircraft spends in the airport.

Considering this background, it is desirable to make available a roller drive unit, or roller conveyor tracks constructed of such units, that can convey items or cargo to virtually any desired place within a cargo hold without significant manual shifting by the operating staff being required.

The difficulties in constructing such a roller drive unit lie on one hand in the need to make the force with which the drive roller presses against the bottom of the container as strong as possible, while on the other hand to make possible the changing of the conveying direction of the roller drive unit, both when the drive roller of the roller drive unit is retracted and when it is raised. Furthermore, the drive roller must be capable of being swiveled upwards when its drive motor is switched on and downwards when the motor is switched off, regardless of the direction in which the container is to be moved. Despite these various, mechanically difficult requirements, the drive unit must be of small dimensions and of low weight, both indispensable prerequisites for its main intended use in aircraft. Because a plurality of such roller drive units are employed simultaneously in a conveyor track, their reliability must be particularly high. The failure of even a single roller drive unit can disrupt the loading process.

The object of the invention is therefore to provide a reliable and nevertheless light-weight roller drive unit that is capable of conveying containers in any desired direction.

SUMMARY OF THE INVENTION

According to the present invention there is provided a roller drive unit for the transportation of freight containers in a plurality of directions comprising a substantially annular fixing means for attachment of the roller drive unit to a floor of a cargo hold; a drive roller for rotational engagement with a freight container to be transported; and a carrier means for the drive roller and relative to which the drive roller can be retracted and can be raised into an operating position for rotational engagement with said freight container, the carrier means being located within the annular fixing means and being rotatable relative thereto in a direction perpendicular to the notional plane of the floor.

It is important that the actuation of the drive roller, that is its raising and rotation as well as its rotation relative to the fixing means by the carrier means, is achieved with the smallest possible number of driving means such as electric motors. Preferably, therefore, a transmission system, such as a planetary gear system, is provided having a first output driving shaft which is used to raise the drive roller in order to produce a frictional engagement with the freight container and having a second output driving shaft which is used to rotate the carrier means relative to the fixing means about a vertical axis, advantageously as predetermined by an automatic or manual control apparatus.

In a planetary gear system, the first output driving shaft is preferably the shaft of a planet wheel carrier of the system, and the second output shaft is preferably a ring gear or hollow shaft of the system. Depending on the disposition of the planetary gear system in the roller drive unit, the carrier means for the drive roller can also be driven by the hollow shaft of the planetary gear system. The drive shaft of the gear system is then preferably the shaft of the sun wheel, which is driven by a first electric motor. The first electric motor and/or the planetary gear is preferably disposed in a suitable manner within the rotatable carrier means element and during rotation actuates a pinion that meshes with a toothed rim on the carrier means.

In a roller drive unit comprising such a planetary gear system, advantageously only two motors are needed to produce rotation of the drive roller, raise it and press it against a freight container to be transported, and to rotate the drive roller into a desired direction as predetermined by the control apparatus.

Preferably, in the region of the first and the second output driving shafts of the planetary gear, at least one separately actuatable output braking mechanism is provided which operates to brake the driving action of at least one of the first and the second output driving shafts when required. Advantageously, there is provided one braking mechanism for each shaft, the two mechanism being separately electrically actuatable. By this means a driving action of the first and/or the second output shaft, when not needed, can be stopped more or less gradually by braking the output shaft.

Preferably, a second electric motor is provided to rotatably drive the drive roller.

Preferably also, a variable gear means is connected between the drive roller and the second electric motor.

Similarly, an actuatable braking mechanism is preferably provided for immobilization of the drive roller.

A sensing means is preferably also provided to measure the velocity of a freight container being transported by the drive roller.

Alternatively or in addition, the drive roller can be provided, preferably at one of its end faces, with a toothed wheel or a pinion and/or have a toothed outer or inner surface. Then in addition there is preferably provided a holder means which is rotatably mounted to one side of the carrier means for rotational movement upwards and downwards and to which the drive roller is rotatably mounted, the second electric motor being provided to drive the drive roller via the variable gear means.

A first measuring means for measuring the rotational speed of the drive roller and a second measuring means for measuring the force with which the drive roller engages a surface of the freight container to be transported when the drive roller is in a raised operating position can be provided in a preferred embodiment of the invention.

Various aspects of the present invention will now be described by way of example with reference to the accompanying drawings.

DESCRIPTION OF THE PREFERRED EMBODIMENTS

Figure 1:
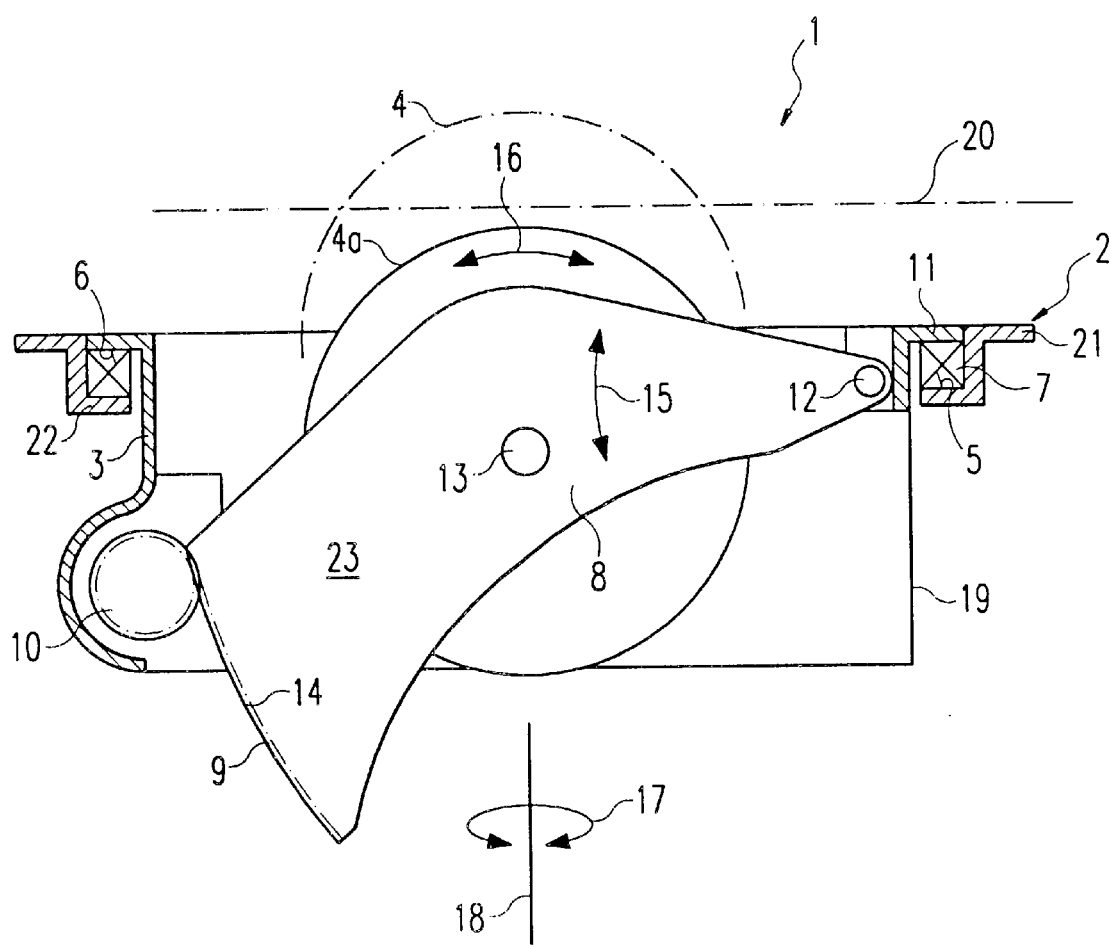
FIG. 1 is a schematic side elevation, in partial vertical section, of a roller drive unit in accordance with the invention.
Figure 2:
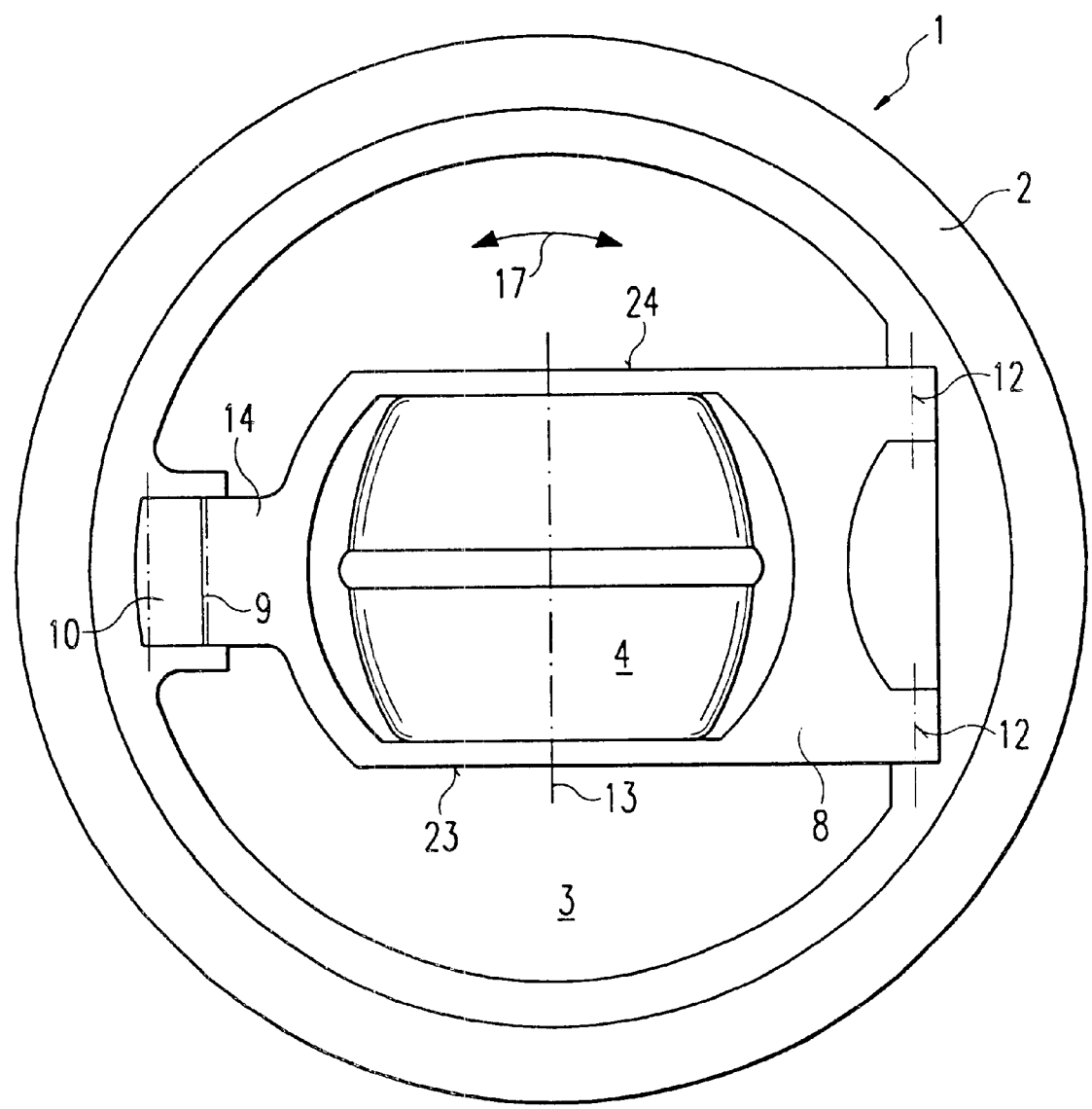
FIG. 2 is a schematic plan view of the roller drive unit shown in FIG. 1.

A roller drive unit 1 in accordance with the invention and shown in FIGS. 1 and 2 comprises an annular fixing means 2, a carrier means 3 and a drive roller 4 or 4a. For the sake of clarity, a cover for the roller drive unit which is also provided per se has been omitted from the drawings.

The annular fixing means 2 comprises an outer collar 21, by means of which the fixing means or the roller drive unit 1 can be simply mounted in a cargo hold, e.g. that of an aircraft, preferably in an opening in the floor of the cargo hold. Into the annular fixing means 2 is inserted the carrier means 3, preferably flush with the upper surface of the fixing means. For this purpose the fixing means 2 is provided with an inner collar 22, which forms a bearing surface 5 for the inserted carrier means 3. The carrier means 3, which preferably defines a cylindrical hollow body 19, is in turn provided with a flange 11, the undersurface of which forms a supporting surface 6 which rests upon the inner collar 22 of the fixing means 2, preferably by way of an annular roller or cylinder bearing 7. Accordingly, the carrier means 3 can be rotated about a vertical axis 18, through an angle in the range from 0 to 180 degrees or in the range from 0 to 90 degrees, as shown by the double-headed arrow 17 into the direction in which a freight container is to be conveyed.

For this purpose the carrier means 3 comprises a toothed rim (not shown), preferably on or in its largely cylindrical hollow body 19. The carrier means 3 is preferably controllably operated, preferably by a first driving output of a planetary gear system (not shown) driven by an electric motor as previously explained, such that its rotation is possible both with a retracted drive roller 4a (resting position) and with a raised drive roller 4 (operating position).

In the rotatable carrier carrier means 3 is provided a pivoted holder or cage 8 that can be rotated up and down, as indicated by the double-headed arrow with the reference numeral 15 in FIG. 1. At one end the pivoted holder 8 is coupled to the carrier means 3, as indicated by the reference numeral 12 in FIGS. 1 and 2. At its other end 14, which can be rotated up and down, the pivoted holder 8 is provided with a toothed edge 9. The toothed edge 9 meshes with a pinion 10, which may likewise be rotatably disposed in or on the carrier means and which is preferably controllably driven by a second driving output of the planetary gear system (not shown). When in operation, the pinion 10 acts on the toothed edge 9 so as to move the pivoted holder 8 upward into one of a plurality of operating positions for the drive roller 4 or downward into the single resting position of the drive roller 4a, dependent on its direction of rotation. When the pressure exerted by the drive roller against the bottom of a container situated above the drive roller 4 in a transport plane 20 needs to be increased, the drive roller 4 is moved by way of the drive pinion 10, the toothed edge 9 and the pivoted holder 8 so as to raise it from a first, lower operating position above the transport plane 20 into a second, higher operating position above the transport plane 20.

The pivoted holder 8 comprises two opposed, kidney-shaped side plates 23 and 24, which are joined to one another by cross-pieces at their ends. At their first ends, the plates 23 and 24 are coupled to the carrier means 3, and at their second ends, which in each case comprise the toothed edge 9, they are joined together in such a way that a gap is defined between them within which the drive roller 4 is accommodated, preferably in the middle. Transverse to the axis about which the carrier means 3 is rotated there is disposed between the two side surfaces 23 and 24 an axle or shaft (not shown) that carries the drive roller 4 on bearings, so that the drive roller 4 can be driven by a second electric motor (not shown) so as to rotate forward or backward about an axis of rotation 13 in the directions indicated by double-headed arrow 16. Preferably, a variable, stepped gear means is interposed between this second electric motor and the drive roller 4.

It will be evident that instead of kidney-shaped side plates 23 and 24 it is also possible to use side plates having a different shape but with the same effect.

Figure 3:
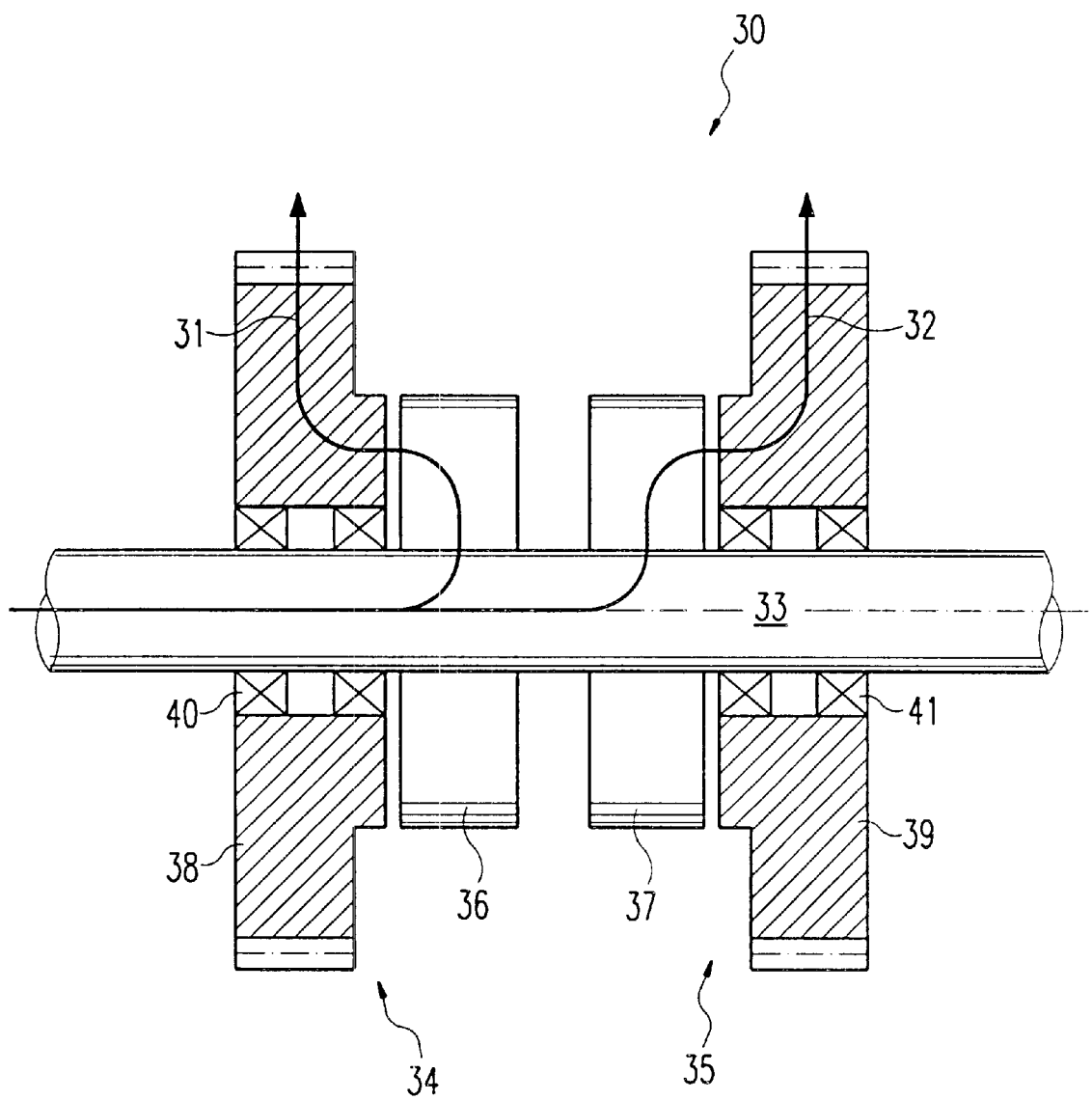
FIG. 3 is a part sectional view of a gear transmission system with two driving outputs.

As an alternative to the use of a planetary gear system, for example, another transmission system with two driving outputs can be used. An example thereof is the gearing 30 shown in FIG. 3, which comprises a first driving output 31 and a second driving output 32. On an elongated motor shaft 33 of an electric motor (not shown) two drive units 34 and 35 are arranged, which are rotationally movable independently of one another. The first drive unit 34 comprises a drive pinion 38, a pivot bearing 40 and a coupling 36, arranged such that the drive pinion 38 and the coupling 36 are rotatably mounted on the motor shaft 33 by way of the pivot bearing 40. Similary, the second drive unit 35 comprises a drive pinion 39, a pivot bearing 41 and a coupling 37, arranged such that the drive pinion 39 and the coupling 37 are rotatably mounted on the motor shaft 33 by way of the pivot bearing 41. By actuating one or both of the couplings 36 and 37 a force-transmitting connection can be created between the motor shaft 33 and one or bother of the driving outputs 31 and 32, as desired. If such a transmission system is employed, for example, to drive the roller drive unit described here, it is possible, for example, to use the driving output 31 to controllably drive the carrier means 3 and the driving output 32 to controllably drive the pinion 10.

Preferably, in the region of the first and/or the second driving outputs 31, 32 of the planetary gear system or other transmission system one or more separately actuatable output braking mechanisms (not shown) are provided, each of which prevents or gradually reduces the driving action of the first and/or second driving outputs 31, 32 when such driving action is not needed. Likewise, an actuatable braking mechanism (not shown) can be provided to immobilize the drive roller 4.

A sensing means (not shown) can also be provided in or at the drive roller 4 to measure the velocity of a container being conveyed by the drive roller 4 and a measuring means can be provided to monitor the rotational speed or the velocity of the drive roller 4.

A second measuring means (not shown) can be provided to monitor the force with which the drive roller 4, in its raised operating position, presses against the bottom of a container to be conveyed.

To avoid slippage between drive roller 4 and container, a regulating apparatus (not shown) can then be provided to regulate the pressing force and/or the rotational speed or the velocity of the drive roller 4.

What is claimed is:

1. A roller drive unit for the transportation of freight containers in a plurality of directions comprising:
    a substantially annular fixing means for attachment of the roller drive unit to a floor of a cargo hold;
    a drive roller for rotational engagement with a freight container to be transported; and
    a carrier means for the drive roller and relative to which the drive roller can be retracted and can be raised into an operation position for rotational engagement with said freight container, the carrier means being located within the annular fixing means and being rotatable relative thereto in a direction perpendicular to the rotational plane of the floor, wherein the carrier means defines a supporting surface and the fixing means defines a bearing surface which bears the supporting surface of the carrier means, and wherein the carrier means defines a substantially cylindrical hollow body that is provided with a flange, an undersurface of the flange defining the supporting surface.

2. A roller drive unit for the transportation of freight containers in a plurality of directions comprising
    a substantially annular fixing means for attachment of the roller drive unit to a floor of a cargo hold;
    a drive roller for rotational engagement with a freight container to be transported;
    a carrier means for the drive roller and relative to which the drive roller can be retracted and can be raised into an operating position for rotational engagement with said freight container, a carrier means being located within the annular fixing means and being rotatable relative thereto in a direction perpendicular to the rotational plane of the floor; and
    a holder means which is rotatably mounted to one side of the carrier means for rotational movement upwards and downwards and to which the drive roller is rotatably mounted, wherein the holder means defines at least one toothed edge and a drive pinion is provided that meshes with said toothed edge as the holder means pivots in order to raise the drive roller.

3. A roller drive unit as claimed in claim 2, wherein the holder means defines at least one toothed edge and a drive pinion is provided that meshes with said toothed edge as the holder means pivots in order to raise the drive roller.

4. A roller drive unit for the transportation of freight containers in a plurality of directions comprising
    a substantially annular fixing means for attachment of the roller drive unit to a floor of a cargo hold;
    a drive roller for rotational engagement with a freight container to be transported;
    a carrier means for the drive roller and relative to which the drive roller can be retracted and can be raised into an operating position for rotational engagement with said freight container, the carrier means being located within the annular fixing means and being rotatable relative thereto in a direction perpendicular to the rotational plane of the floor; and
    a transmission system with a first output driving shaft which is used to raise the drive roller in order to produce a frictional engagement with said freight container and a second output driving shaft which is used to rotate the carrier means relative to the fixing means about said axis perpendicular to the plane of the floor.

5. A roller drive unit as claimed in claim 4, wherein the transmission system comprises a planetary gear system.

6. A roller drive unit as claimed in claim 5, comprising a first electric motor which drives a drive shaft of a sun wheel of the planetary gear system.

7. A roller drive unit as claimed in claim 4, wherein at least one separately actuatable output braking mechanism is provided which operates to brake the driving action of at least one of the first and the second output driving shafts when required.

8. A roller drive unit as claimed in claim 6, wherein a second electric motor is provided to rotatably drive the drive roller.

9. A roller drive unit as claimed in claim 8, wherein a variable gear means is connected between the drive roller and the second electric motor.

* * * * *